US006286079B1

(12) United States Patent
Basham et al.

(10) Patent No.: US 6,286,079 B1
(45) Date of Patent: *Sep. 4, 2001

(54) INTERRUPTIBLE INVENTORY OF A MASS DATA STORAGE LIBRARY

(75) Inventors: Robert Beverley Basham; Paul Merrill Greco; Leonard George Jesionowski, all of Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,229

(22) Filed: Jan. 11, 1999

(51) Int. Cl.[7] ................................................ G06F 12/00
(52) U.S. Cl. ......................... 711/112; 711/111; 711/114; 711/161
(58) Field of Search ................................ 707/200; 711/112, 711/114, 161, 111

(56) References Cited

U.S. PATENT DOCUMENTS

| 5,046,076 | 9/1991 | Hill . |
| 5,059,772 | 10/1991 | Younglove . |
| 5,396,600 | 3/1995 | Thompson et al. . |
| 5,412,791 | 5/1995 | Martin et al. . |
| 5,416,914 | * 5/1995 | Korngiebel et al. ............... 711/114 |
| 5,469,560 | * 11/1995 | Beglin ................................. 711/112 |
| 5,590,375 | * 12/1996 | Sangveraphunsiri et al. . |
| 5,600,821 | 2/1997 | Falik et al. . |
| 5,675,769 | 10/1997 | Ruff et al. . |
| 5,708,848 | * 1/1998 | Sangveraphunsiri et al. ......... 710/21 |
| 5,933,395 | * 9/1999 | Dang et al. ......................... 369/34 |
| 6,014,675 | * 1/2000 | Brewer et al. ..................... 707/204 |
| 6,044,442 | * 3/2000 | Jesionowski ....................... 711/153 |
| 6,052,341 | * 4/2000 | Bingham et al. .................. 369/34 |
| 6,098,119 | * 8/2000 | Surugucchi et al. .............. 710/10 |

* cited by examiner

Primary Examiner—B. James Peikari
Assistant Examiner—Christian P. Chace
(74) Attorney, Agent, or Firm—John H. Holcombe; Robert M. Sullivan (57) ABSTRACT

Storage shelves of a mass data storage library are organized into a plurality of subsets for the purpose of conducting an inventory of media stored in the shelves. In response to an inventory command, the inventory is conducted in a predetermined order by subset. Upon completion of the inventory of each subset, the completion is posted in a list. A command input detects newly issued commands (subsequent to the inventory command), and places them in a queue. After completion of the inventory of a subset, and upon detecting a command for a non-inventory process (such as a media move), the inventory is interrupted and stopped. The move is conducted, and, upon completion of the move, the inventory is resumed. If a newly issued command is an inventory command, the inventory command is incorporated into the inventory process.

30 Claims, 6 Drawing Sheets

COMMAND QUEUE 170

| | COMMAND | ORIGIN 172 | TIME 173 |
|---|---|---|---|
| 171 | COMMAND | ORIGIN | TIME |
| 174 | MOVE PV XXYYY (FROM KKKK) TO DR0 | HOST 0 | PPP |
| 240 | CONDUCT INVENTORY | LM | PQQ |
| 311 | MOVE PV YYYXX (FROM BBBB) TO DR1 | HOST 1 | QQQ |
| 312 | MOVE PV XYZXX (FROM CCCC) TO DDDD | HOST 1 | RQQ |
| 340 | CONDUCT INVENTORY | HOST 0 | RRR |
| 341 | CONDUCT INVENTORY | HOST 1 | RSS |

FIG. 5

INVENTORY TABLE

| SHELF ID | SUBSET | PM VOLSER |
|----------|--------|-----------|
| A000 | 1 | ZXXYY |
| A001 | 1 | XXZYZ |
| ≈ | ≈ | ≈ |
| D015 | 4 | XZYXX |
| D016 | 4 | YYYYZ |
| D017 | 4 | — |

*FIG. 6*

SUBSET LIST

| SUBSET | POSTING |
|--------|---------|
| 1 | COMPLETE |
| 2 | COMPLETE |
| 3 | COMPLETE |
| 4 | INCOMPLETE |
| 5 | INCOMPLETE |
| ≈ | ≈ |
| 13 | INCOMPLETE |
| 14 | INCOMPLETE |

INTERRUPTIBLE INVENTORY OF A MASS DATA STORAGE LIBRARY

TECHNICAL FIELD

This invention relates to mass data storage libraries for storing data storage media in storage shelves, and, more particularly, to conducting an inventory of the media stored in the storage shelves.

BACKGROUND OF THE INVENTION

A mass data storage library typically stores thousands of data storage media. When the library is powered up, an inventory must be conducted to determine the specific data storage media, if any, stored in each storage shelf.

Typically, the inventory is conducted by a robot in the library. The robot normally is used to transport data storage media between the storage shelves and data storage drives for reading and/or writing data on the media. Hence, instead of transporting media, a scanner, viewer or other sensor mounted on the robot is moved to each individual storage shelf, and is operated to read an identifier on the data storage media stored in the storage shelf, or to detect that the storage shelf is empty. U.S. Pat. No. 5,059,772, Younglove, illustrates an example of an automated magnetic tape cartridge library and a method for taking a library inventory, necessitated by possible manual removal or insertion of cartridges after opening of a library door.

Additionally, a mass data storage library is often employed to store data for a plurality of host computer systems. As the result, each host needs to have an inventory of the storage shelves storing data storage media assigned, either on a sole or on a shared basis, to the host. For example, U.S. Pat. No. 5,416,914, Korngiebel et al., illustrates a single mass data storage library for storing a plurality of types of media, and having a corresponding plurality of types of data storage drives for reading and/or writing on the media. The library is partitioned into corresponding subsets which have consistent mechanical and electrical characteristics, and a management system maps the media type as part of the inventory.

Thus, when the library is powered up, the library must conduct an inventory, and then each host, upon sensing that the library is powered up, will also request an inventory. In prior libraries, each inventory is then separately conducted.

During each of these inventory processes, the library is prevented from transporting any media for two reasons. First, the robot is conducting the inventory and is unavailable, and, second, any movement of a media to or from one storage shelf, or from one storage shelf to another, will corrupt any inventory.

After the inventory is completed, an inventory manager of the library will typically track all movements of the robot and thereby track any changes in position of the media. Thus, the inventory is continually updated.

However, mass data storage libraries often are provided with doors or other access to the storage shelves and/or to the robot. This will allow an operator to repair or modify the robot, or to add or remove media from the storage shelves. Hence, when an access door is opened, the potential exists to modify the content of the library, and the inventory must be again be taken. Therefore, the library is once again removed from service, and the robot operated to take an inventory. Additionally, the hosts may be informed of the access door opening and each will command that an inventory be taken, again prolonging the library's removal from service in order to repeat the inventory.

SUMMARY OF THE INVENTION

It is an object of the present invention to provide an inventory of a mass data storage library while not requiring removal of the library from service during the inventory.

Another object of the present invention is to prevent repetitions of the same inventory to satisfy request for an inventory while another inventory is being conducted.

Disclosed are a method, a computer program product and a system for conducting an inventory of data storage media stored in a mass data storage library. The library storage shelves are organized into a plurality of subsets of storage shelves for the purpose of conducting the inventory. In response to an inventory command, the inventory of the media stored in the subsets of storage shelves is conducted in a predetermined order by subset. Upon completion of the inventory of each subset of storage shelves, the completion is posted in a list. A command input detects newly issued commands (subsequent to the inventory command), places them in a queue, and upon detecting a command for a non-inventory process (such as a media move), the inventory of the subsets of storage shelves is interrupted, stopping the inventory of the subsets of storage shelves. If no subset of storage shelves for which a completion has been posted is involved in the non-inventory process, the non-inventory process is conducted, and, upon completion of the non-inventory process, the inventory is resumed.

In another aspect of the present invention, upon detecting a newly issued inventory command subsequent to the initiation of the inventory step and prior to completion of the inventory, the subsequent inventory command is incorporated into the inventory step.

In response to an occurrence of an event which may corrupt the inventory, the posting of some or all the subsets of storage shelves are reset to incomplete.

In an additional aspect of the present invention, where the non-inventory move process comprises moving one of the media from a source to a destination, and if the source comprises a storage shelf from a recently inventoried subset for which a completion has been posted, the non-inventory move step is additionally conducted, and the inventory of the subset of storage shelves for which a completion has been posted is updated upon completion of the move.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
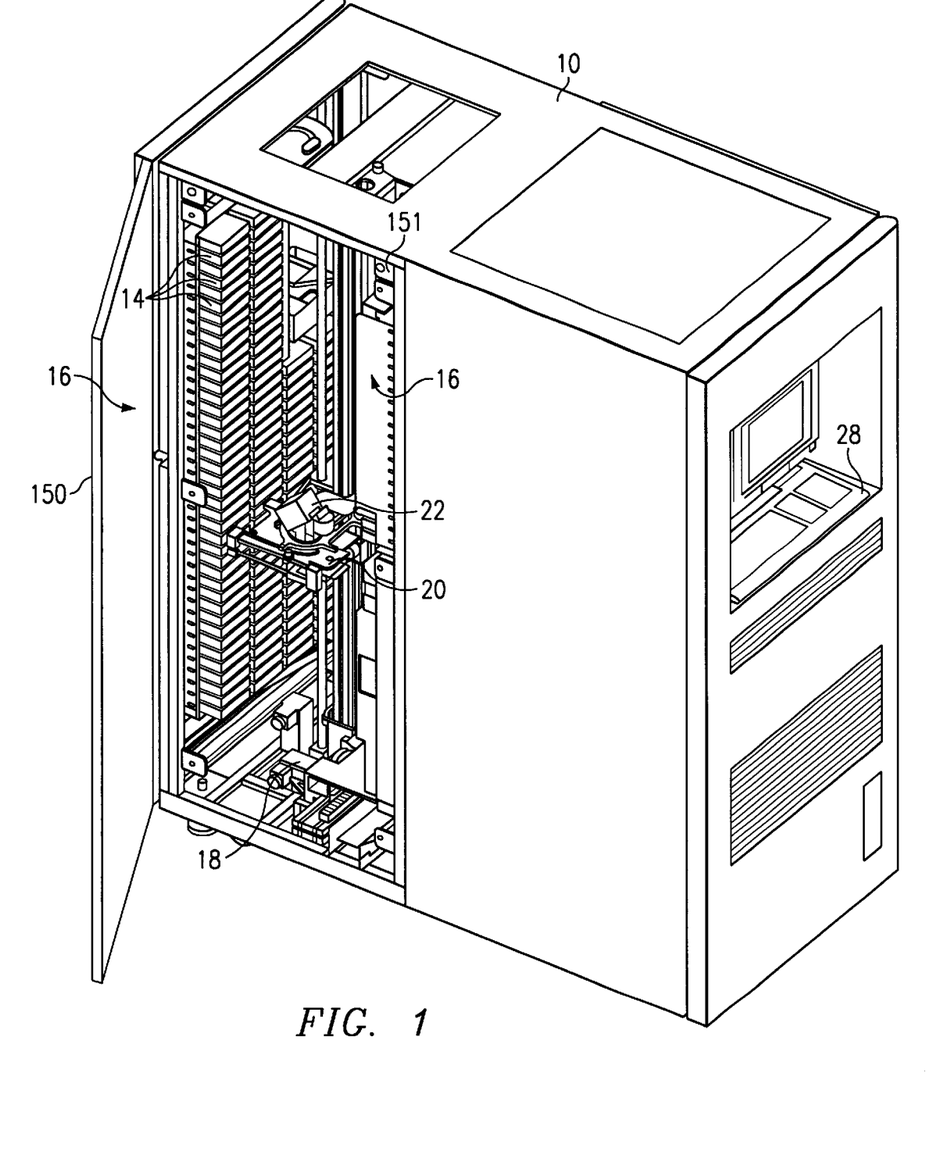
FIG. 1 is an isometric view of a mass data storage library which may implement the present invention.
Figure 2:
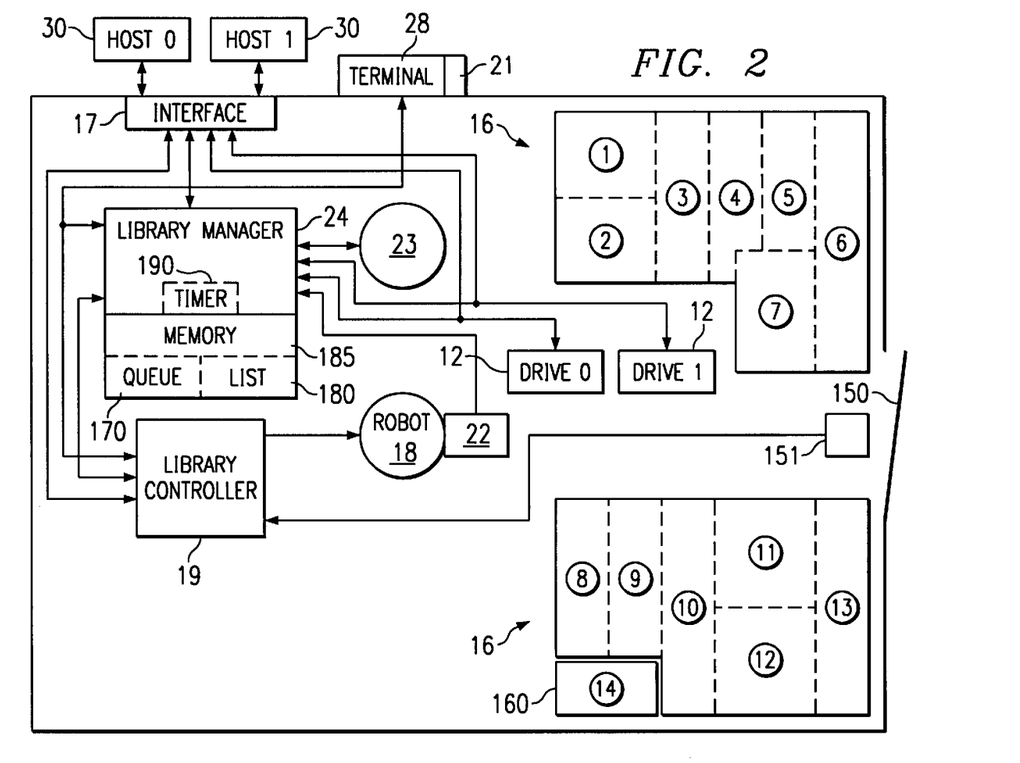
FIG. 2 is a block diagram of the mass data storage library of FIG. 1, including a library manager, and showing an organization of the storage shelves into a plurality of subsets in accordance with the present invention.

Referring to FIGS. 1 and 2, a mass data storage library 10 is illustrated which, as an example, comprises an automated tape cartridge storage and retrieval library for storing and accessing data storage media comprising physical volumes of magnetic tape cartridges. Alternatively, the mass data storage library 10 may comprise an optical storage and retrieval library or a tape cassette library, etc. The mass data storage library 10 includes one or more data storage drive units 12 for reading and/or writing data on the media, a plurality of storage shelves 16 for storing data storage media 14, an accessor robot 18, a library controller 19 for operating the accessor robot, and a library manager 24. The accessor robot 18 transports a selected physical volume media 14 between a storage shelf 16 and a drive 12, or between storage shelves. The accessor robot 18 includes a cartridge gripper 20 and a bar code scanner 22, or similar vision system, mounted on the gripper 20, to "read" identifying cartridge labels. The data storage drives 12 can be optical disk drives or magnetic tape drives and the physical volumes can comprise cartridges or cassettes containing optical or magnetic media, respectively, or any other removable media and associated drives. An example of a mass data storage library 10 which may implement the present invention is the IBM 3494 Tape Library Dataserver.

The library controller 19 and library manager 24, comprise at least one computer processor, and are coupled to an input/output station 21 and a terminal 28. The computer processor may comprise, for example, an IBM RS/6000 processor. Alternatively, library controller 19 and library manager 24 may each comprise a computer processor, and the computer processors are interconnected. The input/output station 21 may comprise a station for reading a data storage medium, such as a floppy disk, and may comprise part of the terminal 28.

The library manager 24 is coupled with, and controls the load/unload and related actions of, the drives 12 (through their associated controllers), and the library manager 24 is coupled with, and coordinates the operation of the library controller 19.

The library manager is coupled through a provided interface 17 to one or more host systems 30. The host systems provide commands to the library manager to retrieve selected logical volumes, the library manager looks up the physical volumes of media 14 which contain the selected logical volumes and the storage shelves in which the media are stored, and causes the library controller 19 to access the selected media and deliver the volumes to selected ones of the drives 12. The library manager 24 has a library manager database 23 which includes storage (typically one or more hard disk drives) for tables and programs, including a table which relates the logical volumes to the physical volumes, and a table which relates the physical volumes (media) to the storage shelves, for instructing the library controller to retrieve a selected media 14 from a storage shelf 16, the media containing a logical volume requested by a host. Data access commands and information to be recorded on, or to be read from, selected logical volumes on the media 14 are transmitted between the drives 12 and the host 30. In an alternative arrangement, the library manager 24 temporarily stores the selected logical volumes in its database 23 as "virtual drives" and forwards the logical volume data to the host.

The database 23 defines each media in terms of its identifier, which is typically a volume serial number, or VOLSER.

Figure 3A:
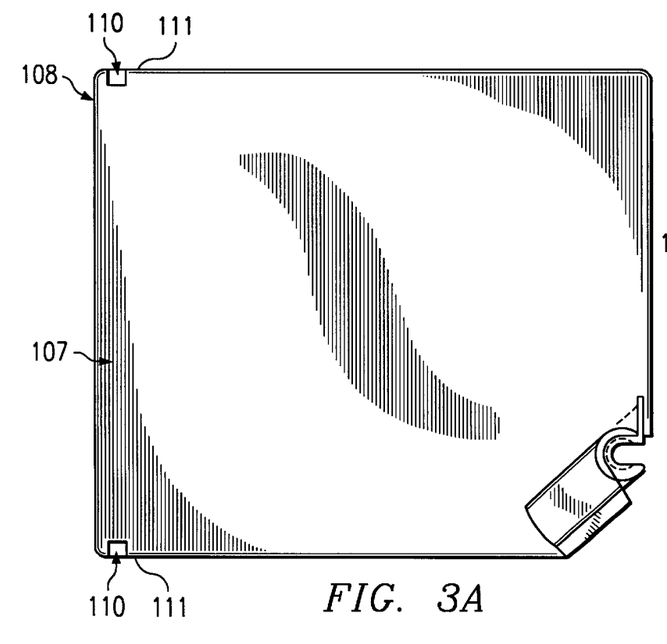
FIGS. 3A, 3B and 3C are respectively top and end views of an exemplary magnetic tape cartridge data storage media and an illustration of the identifying label positioned on the media, which is employed for conducting an inventory of the storage shelves of FIGS. 1 and 2.
Figure 3B:
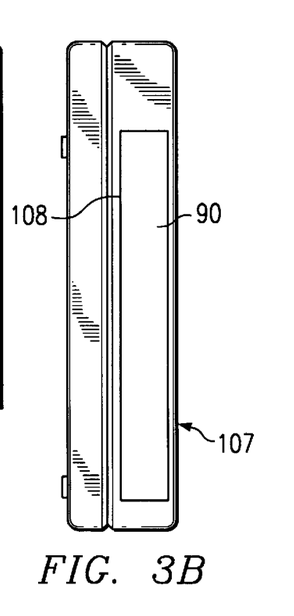
Figure 3C:
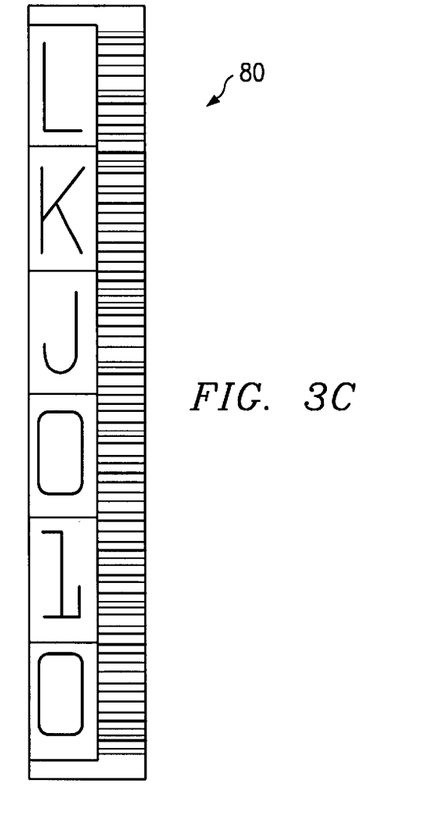

In FIGS. 3A and 3B, a data storage media 107 is illustrated, which, for example, comprises a magnetic tape cartridge. The cartridge 107 has an identifying label 90 on an outer edge 108. The cartridge may be engaged by the accessor robot picker 20 at notches 110 or surfaces 111 for removal from and/or delivery to a storage shelf 16 or a data storage drive 12. Referring additionally to FIG. 3C, the typical data storage media identifying label includes a bar code media identifier 80 on the label. The cartridge 107 is positioned in the storage shelf so that the label 90 is facing outward and is thus visible to the bar code reader 22, and which may be read by the bar code reader 22 as the media is stored at a storage shelf 16.

The identifier of a data storage media is typically read by the bar code reader 22, and the identifier is provided to the library manager for conducting an inventory of the storage shelves. Additionally, the identifier may be supplied to the library controller for verifying that the picker 20 is positioned so as to access the correct media during a move process.

Typically, the identifier 80 is the volume serial number (VOLSER) of the media. Both the physical volume and the contained logical volumes are identified by VOLSER's, but the physical volume VOLSER is typically the only identifier 80 on the label 90.

Figure 4:
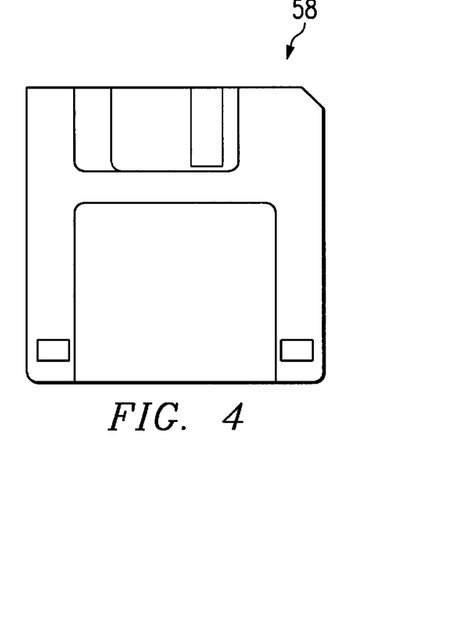
FIG. 4 is an illustration of a storage medium for storing computer executable instructions.

Referring to FIGS. 2 and 4, the computer readable program code of a computer program product(s) may be supplied at I/O station 21 from a storage medium 58 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a network or one of the hosts 30 at a communications interface, such as interface 17. In the embodiment of FIG. 2, the computer readable program code operates the library controller 19 and library manager 24, through their computer processor or processors.

Referring to FIG. 2, when the library is powered up, an inventory must be conducted to determine the specific data storage media, if any, stored in each of the storage shelves 16.

Typically, the inventory is conducted by the robot 18. The scanner 22, viewer or other sensor mounted on the robot is moved to each individual storage shelf, and is operated to read the identifier 80 on the data storage media stored in the storage shelf, or to identify that the shelf is empty. As discussed above, U.S. Pat. No. 5,059,772, Younglove, illustrates an example of an automated magnetic tape cartridge library and a method for taking a library inventory.

Additionally, each of the hosts, as discussed above, may need to have an inventory of the storage shelves storing data storage media assigned, either on a sole or on a shared basis, to the host.

Thus, when the library is powered up, the library must conduct an inventory, and then each host, upon sensing that the library is powered up, will also request an inventory. In prior libraries, each inventory is then separately conducted, typically sequentially.

During each of these inventory processes, the library is prevented from transporting any media for two reasons. First, the robot 18 is conducting the inventory and is unavailable, and, second, any movement of a media to or from one storage shelf, or from one storage shelf to another, may corrupt the inventory.

After the inventory is completed and stored to the database 23, the library manager 24 will typically track all movements of the robot and thereby track any changes in position of the media. Thus, the inventory is continually updated.

However, mass data storage libraries often are provided with a door 150 or other access to the storage shelves and/or to the robot. This will allow an operator to repair or modify the robot, or to add or remove media from the storage shelves. Hence, when an access door is opened, the potential exists to modify the content of the library, an event which may corrupt the inventory, and the inventory must be again be taken. A sensor 151 senses an open door and supplies a signal to the library controller 19, which signals the library manager 24. Therefore, the library is once again removed from service, and the robot operated to take an inventory. Additionally, the hosts 30 may be informed of the access door opening and each will command that an inventory be taken, again prolonging the library's removal from service in order to repeat the inventory.

As discussed above, objects of the present invention are to provide an inventory of a mass data storage library while not requiring removal of the library from service during the inventory, and to prevent repetitions of the same inventory to satisfy a request for an inventory while another inventory is being conducted.

In accordance with the present invention, a method, a computer program product and a system are described for conducting an inventory of data storage media stored in a mass data storage library.

Referring to FIG. 2, the library storage shelves 16 are organized into a plurality of subsets of storage shelves for the purpose of conducting the inventory. In the embodiment of FIG. 2, the subsets are contiguous areas of the storage shelves, but may alternatively be organized in any convenient manner, for example, into subsets which have consistent mechanical and electrical characteristics corresponding to the subsets of U.S. Pat. No. 5,416,914, Korngiebel et al., above.

As illustrated in FIG. 2, the standard shelves are organized in subsets "1" through "13", and subset "14" comprises a media input/output port 160 at which media may be manually removed from or added to the library without opening the door 150. The library manager 24 will respond to commands from a host 30 or terminal 28 to direct the library controller 19 to operate the robot 18 to reposition the cartridges between the input/output port 160 and selected storage shelves 16.

Figure 5:
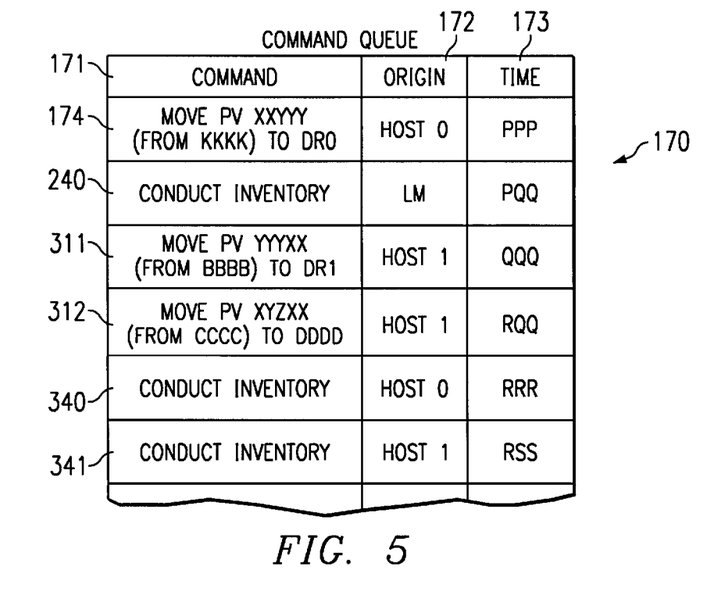
FIGS. 5, 6 and 7 are respectively diagrammatic illustrations of examples of a command queue, an inventory table, and a subset list of the library manager of FIG. 2 in accordance with the present invention.
Figure 6:
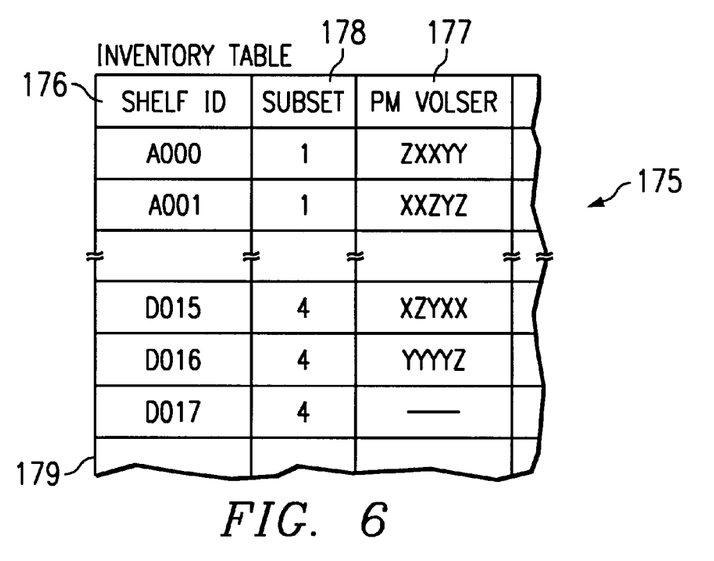
Figure 7:
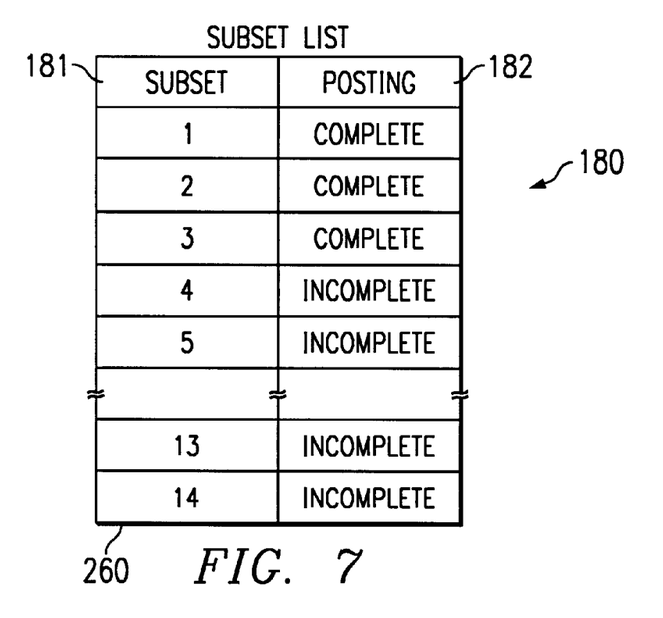

FIGS. 5, 6 and 7 are respectively diagrammatic illustrations of examples of a command queue 170, an inventory table 175, and a subset list 180 of the library manager 24 of FIG. 2 in accordance with the present invention. In the embodiment of FIG. 2, the command queue 170 and subset list 180 are maintained in the memory 185 of the library manager. The inventory table 175 is preferably maintained in the library manager database 23.

The command queue 170 contains a sequence of commands received by, or initiated at, the library manager 24. The queue stores at least the command 171, the origin 172 of the command, and the time 173, either the time that the command was received or the time that the command was posted to the queue. For example, command 174 is a "MOVE" command originating with "HOST 0", directing that media physical volume "XXXYY" is to be moved from its storage shelf to data storage drive "DR 0". The host may originally have requested the move of a logical volume and the library manager 24 has looked up the physical volume VOLSER for the logical volume from the database 23 and looked up the storage shelf "KKKK" from the inventory table 175.

The inventory table 175 lists each storage shelf 176, and relates the storage shelves to the media stored therein 177 by physical volume VOLSER. In accordance with the present invention, the subset 178 in which each shelf is located is also identified. If a storage shelf is empty, such as shelf 179, the physical volume VOLSER column 177 is either blank or has a special "empty" identifier. The inventory table typically provides additional information in other columns, or has a separate table having other information relating to each physical and/or logical volume.

Figure 8:
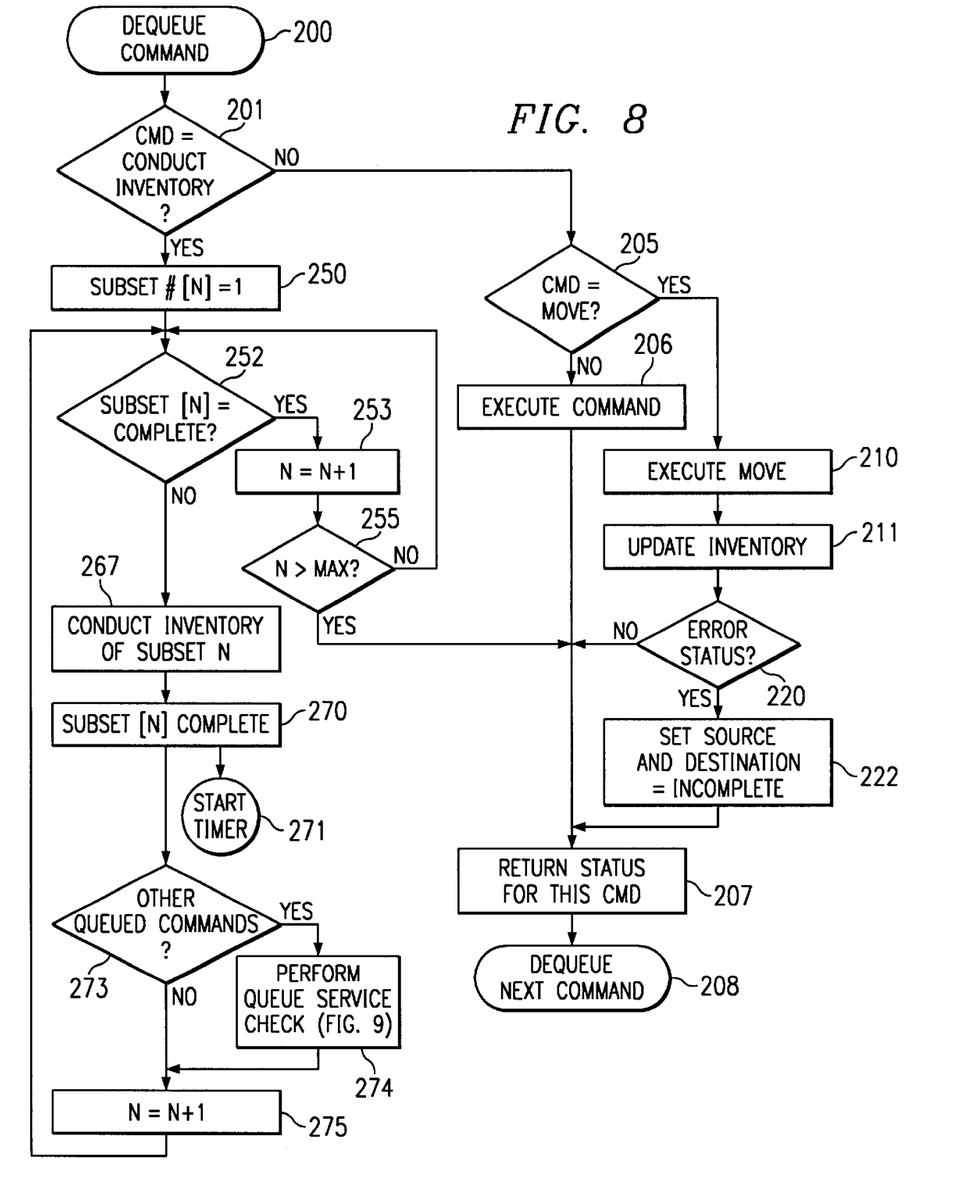
FIGS. 8 and 9 are flow charts depicting the method of the present invention.
Figure 9:
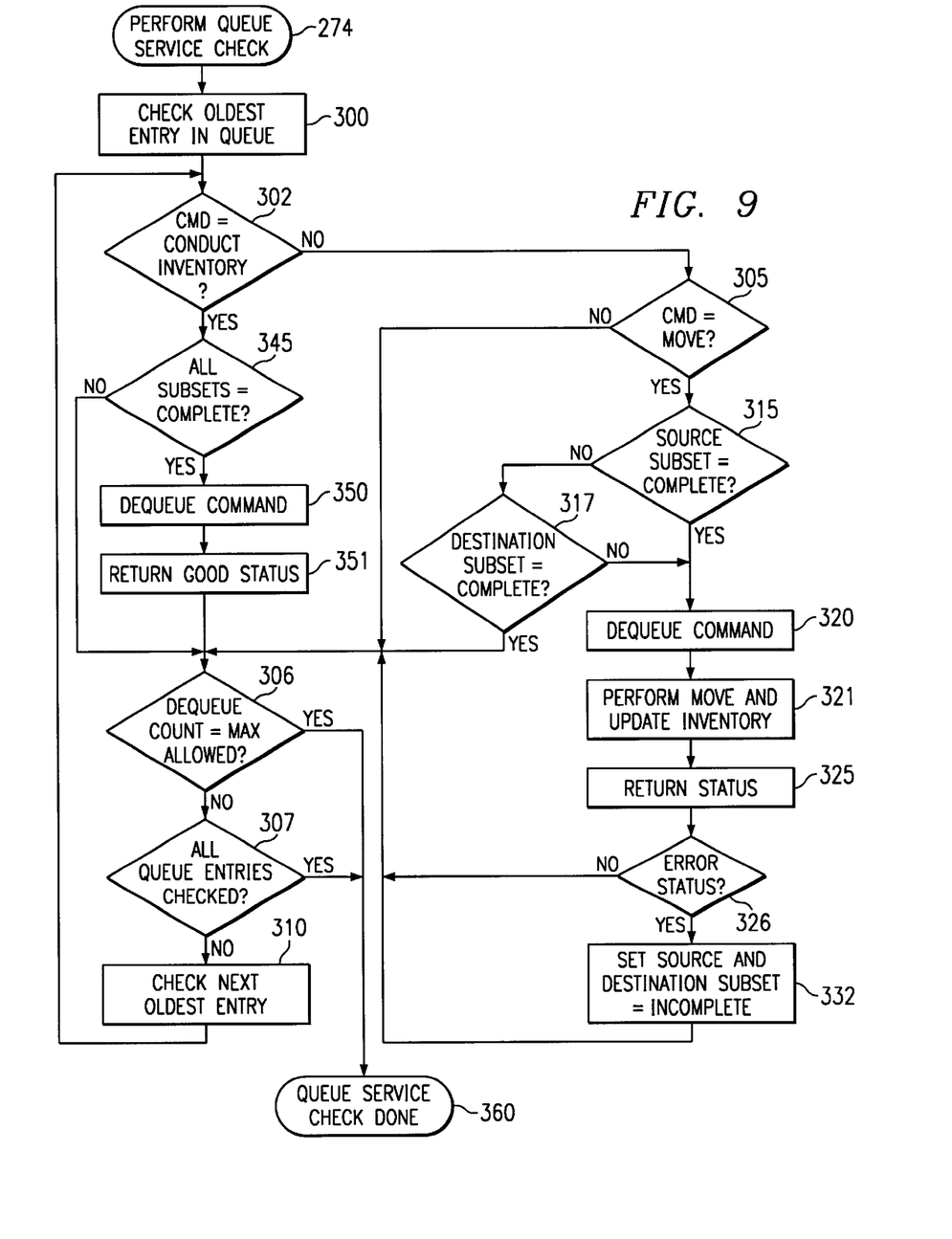

FIGS. 8 and 9 are flow charts depicting an embodiment of the method of the present invention. The present invention, as discussed above, may be implemented as a program product and supplied to the library manager 24 of FIG. 2 at input/output station 21, for example, by storage medium 58 which stores executable computer instructions. The program product may be implemented as an inventory manager, preferably as an application in the library manager 24.

The program product establishes the subset list 180 of FIG. 7 in memory 185 of the library manager. The inventory manager of the present invention additionally causes the library manager (or asks an operator) to organize the storage shelves into subsets, and the inventory manager adds the subsets to the inventory table, and generates the subset list. The subset list lists each of the subsets 181 and provides a "POSTING" column 182 for indicating whether the inventory of that subset has been completed or is incomplete. The column may identify the completion of the inventory by means of a single bit, "0" for incomplete and "1" for complete.

In accordance with the present invention, a timer 190 is also established in the library manager 24 and coupled to the inventory manager. The inventory manager, upon posting the completion of an inventory of a subset, starts the timer to count from a beginning count to a predetermined count, such as counting down to 0. The timer will prevent the subset list 180 from getting too stale by resetting the posting for the most recently posted subset of storage shelves, or of all subsets, to incomplete when the count goes to 0.

Referring to FIGS. 8 and 9, the oldest command in command queue 170 is dequeued in step 200. In step 201, any inventory command is detected, "YES". If the command is not an inventory command, "NO", step 205 determines whether the command is a media move command. If not, "NO", the command is executed by the library manager 24 in step 206, and the status is returned in step 207. Step 208 essentially returns to step 200 to dequeue the next command.

If, in step 205, the command is determined to be a "MOVE" command, such as command 174 in command queue 170 of FIG. 5, step 210 comprises executing the move. As discussed above, the library manager locates the media to be moved from the inventory table, and instructs the library controller to operate the robot to conduct the move. In step 211, the inventory of the inventory table 175 of FIG. 6 is updated to reflect the move.

Step 220 detects whether an error status has been posted. The error status may be that an error occurred as the result of the move, or that the library door 150 has been opened and sensed by sensor 151. Since it is not known what may have occurred as the result of the error status, the presence of an error status, "YES", is presumed to comprise an event which may corrupt the inventory, and results in step 222 setting, in subset table 180 of FIG. 7, both the subset of storage shelves that is the source of the media that was moved, if any, and the subset that is the destination of the media, if any, to "INCOMPLETE". Alternatively, and preferably, if the library door 150 was opened, all subsets of storage shelves may be reset to "INCOMPLETE".

Upon completion of step 222, or, if step 220 indicated that there was no error status, step 207 returns the status and the next command is dequeued.

If the dequeued command is determined, in step 201, to be a "CONDUCT INVENTORY" command, such as command 240 in command queue 170 of FIG. 5, "YES", step 250 sets the number "N" to the identifier of the first subset to be inventoried, which is "1". Step 252 inspects the subset list 180 to determine whether the inventory has recently been taken and is still good, i.e., marked "COMPLETE". If so, "YES", the inventory command will not be re-executed for that subset, and step 253 increments the count to the next subset, and cycles to the next subset to again be tested in step 252. When all of the subsets (e.g., subsets "1" to "14") have been tested and are still marked "COMPLETE", step 253 will increment the count to "15", and step 255 determines that the number "N" is greater than the maximum count and terminates the count by returning status in step 207.

Thus, in accordance with the present invention, any newly issued "CONDUCT INVENTORY" command is incorporated into the recently conducted inventory so that there is no additional downtime to repeat the inventory as to one or all of the subsets of storage shelves.

Should one of the subsets be marked "INCOMPLETE", such as subset 260 in subset list 180 of FIG. 7, "NO" in step 252, the library manager conducts an inventory of that subset in step 267, as discussed above. When the inventory is completed, step 270 posts "COMPLETE" for the subset in the subset table 180, and starts the timer 190 in step 271.

So that other commands can interrupt the inventory of the library, upon completion of the inventory of each subset, step 273 checks the command queue 172 for another command and, if "YES", performs a queue service check, as will be explained, in step 274. Upon completion of the queue service check, or if there are no other queued commands, step 275 increments to the next subset, which is checked for a completion marking in step 252.

FIG. 9 illustrates an embodiment of the queue service check of step 274 of FIG. 8.

Step 300 checks the command queue 170 of FIG. 5, employing column 173 to determine the oldest entry in the queue. Step 302 determines whether the command is a "CONDUCT INVENTORY" command. If the command is not an inventory command, "NO", step 305 determines whether the command is a move command for moving media. If not, "NO", the command is not dequeued, and step 306 checks whether a predetermined maximum number of commands has been dequeued. Step 306 prevents a long string of newly received commands from permanently interrupting the inventory. If not, "NO", step 307 checks the queue to insure that all queue entries have been checked. If there is a remaining command, "NO", step 310 checks the next oldest entry per column 173 in the command queue, and step 302 again checks it for an inventory command, and step 305 checks it for a move command.

If, in step 305, the command is determined to be a "MOVE" command, such as command 311 or command 312 in command queue 170 in FIG. 5, "YES", step 315 checks whether the subset of the source is marked complete in subset list 180. If the subset is complete, or if the subset is incomplete and step 317 determines that the destination subset in also incomplete, steps 320 and 321 dequeue the "MOVE" command and perform the move and update the inventory. Steps 315 and 317 allow the execution of move commands that are either a) from a recently inventoried subset, or b) to a subset that will be inventoried later in the process. Thus, if step 317 determines that the source subset is not complete, but the destination subset is complete, the command is not dequeued or executed, cycling to step 306, discussed above.

Upon executing the "MOVE" command in step 321, status is returned in step 325 and the error status checked in step 326. As above, the error status may be that an error occurred as the result of the move, or that the library door 150 has been opened and sensed by sensor 151. Since it is not known what may have occurred as the result of the error status, the presence of an error status, "YES", results in step 332 setting, in subset table 180 of FIG. 7, both the subset of storage shelves that is the source of the media that was moved, if any, and the subset that is the destination of the media, if any, to "INCOMPLETE". Again, alternatively, and preferably, if the library door 150 was opened, all subsets of storage shelves may be reset to "INCOMPLETE".

Either if there was an error status and step 332 completed, or if there was no error status, the process cycles back to step 306.

Lastly, if the next oldest entry that is checked in step 310 is a "CONDUCT INVENTORY" command, such as command 340 or command 341 in command queue 170 of FIG. 5, step 302 detects the command, "YES". Step 345 checks whether all subsets in subset list 180 are posted as complete. If so, "YES", the inventory command will not be re-executed, and step 350 dequeues the command and step 351 returns good status for the command.

Thus, in accordance with the present invention, any newly issued "CONDUCT INVENTORY" command is incorporated into the inventory that has just been conducted, so that there is no additional downtime to repeat the inventory of the subsets of storage shelves.

If not, "NO", the command is not dequeued. The command is not dequeued so that, when the queue service check is completed, step 360, the inventory will be resumed, and, when the final subset has been completed, step 345 will indicate that all the subsets are complete. Again, step 306 checks whether a predetermined maximum number of commands has been dequeued, to prevent a long string of newly received commands from permanently interrupting the inventory. If not, "NO", step 307 checks the queue to insure that all queue entries have been checked. If there is a remaining command, "NO", step 310 checks the next oldest entry per column 173 in the command queue, and step 302 again checks it for an inventory command, and step 305 checks it for a move command.

If step 306 indicates that the dequeue count has reached a maximum, or if step 307 indicates that all the entries in the queue have been checked, the queue service check is done, step 360, and the inventory is resumed in step 275 of FIG. 8.

Thus, posting the "COMPLETE" and "INCOMPLETE" subsets in the subset list 180, or an equivalent, as may be envisioned by those of skill in the art, allows the inventory to be interrupted to conduct media moves or other commands, avoiding the effective removal of the library from service during the inventory.

Additionally, repetitions of the same inventory of either subsets or of the full inventory are avoided by incorporating the newly commanded inventory into the inventory being conducted. The satisfaction of the request for an inventory while another inventory is being conducted saves the downtime that would otherwise be spent conducting a duplicate inventory.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for conducting an inventory of transportable data storage media stored in a mass data storage library having a plurality of storage shelves for storing said media, having a robot for transporting said media to, from and between said storage shelves, and having a sensor for conducting said inventory by identifying said media at said storage shelves, comprising the steps of:

organizing said plurality of storage shelves into a plurality of subsets of storage shelves for the purpose of conducting said inventory;

conducting an inventory of said media stored in said subsets of storage shelves, in a predetermined order by subset;

upon completion of said inventory of each subset of storage shelves, posting that completion of said inventory to a subset list;

detecting newly received commands, and upon detecting a command for a non-inventory process, interrupting said inventory of said subsets of storage shelves, stopping said inventory of said subsets of storage shelves;

conducting said non-inventory process; and upon completion of said non-inventory process, resuming said step of conducting said inventory.

2. The method of claim 1, wherein said step of detecting newly received commands is conducted only upon completion of said inventory of a subset of storage shelves.

3. The method of claim 2, wherein said step of resuming said step of conducting an inventory additionally comprises resuming said step with the subset of storage shelves immediately following said subset having said posted completion.

4. The method of claim 1, wherein said inventory conducting step is initiated in response to detection of an inventory command, and wherein, upon said step of detecting newly received commands detects an inventory command subsequent to said initiation of said step of conducting an inventory and prior to completion of said step, said subsequent inventory command is incorporated into said step of conducting an inventory.

5. The method of claim 4, wherein an event may occur which may corrupt said inventory, and wherein said method additionally comprises the step of, in response to an occurrence of said corrupting event, resetting said posting of completion of all said subsets of storage shelves to incomplete.

6. The method of claim 1, additionally comprising the step of:

determining whether said non-inventory process involves any of said subsets of storage shelves for which a completion has been posted; and wherein said non-inventory conducting step is conducted only if said step of determining whether a completion has been posted determines that no subset of storage shelves for which a completion has been posted is involved.

7. The method of claim 6, wherein said non-inventory process comprises moving one of said media from a source to a destination, and wherein said non-inventory conducting step is additionally conducted if said step of determining whether a completion has been posted determines that said source comprises a storage shelf in any of said subsets of storage shelves for which a completion has been posted; and comprising the additional step of:

updating the inventory of said subset of storage shelves for which a completion has been posted.

8. The method of claim 7, wherein an event may occur during said move process which may corrupt said inventory, and wherein said method additionally comprises the steps of:

determining whether said corrupting event occurred during said move process, setting an error status in response to said corrupting event; and upon said error setting step indicating an error status, resetting said posting of said inventory of said source and said destination subsets of storage shelves to incomplete.

9. The method of claim 2, additionally comprising the steps of:

upon conducting said step of posting a completion counting from a beginning count to a predetermined count;

terminating said count and again counting from said beginning count upon each subsequent step of posting a completion;

terminating said count upon completion of said inventory for all said subsets of storage shelves; and upon said count reaching said predetermined count, resetting said posting of completion for the most recently posted subset of storage shelves to incomplete.

10. The method of claim 9, wherein said step of resetting said posting of completion resets said posting of completion for all said subsets of storage shelves to incomplete.

11. A computer program product usable with a programmable computer processor having computer readable program code embodied therein for conducting an inventory of transportable data storage media stored in a mass data storage library having a plurality of storage shelves for storing said media, having a robot for transporting said media to, from and between said storage shelves, and having a sensor for conducting said inventory by identifying said media at said storage shelves, wherein said plurality of storage shelves are organized into a plurality of subsets of storage shelves for the purpose of conducting said inventory, comprising:

computer readable program code which causes said programmable computer processor to conduct an inventory of said media stored in said subsets of storage shelves, in a predetermined order by subset;

computer readable program code which causes said programmable computer processor to, upon completion of said inventory of each subset of storage shelves, post that completion of said inventory to a subset list;

computer readable program code which causes said programmable computer processor to detect newly received commands, and upon detecting a command for a non-inventory process, to interrupt said inventory of said subsets of storage shelves, stopping said inventory of said subsets of storage shelves;

computer readable program code which causes said programmable computer processor to conduct said non-inventory process; and computer readable program code which causes said programmable computer processor to, upon completion of said non-inventory process, resume causing said programmable computer processor to conduct said inventory.

12. The computer program product of claim 11, wherein said computer readable program code which causes said programmable computer processor to detect newly received commands causes said detection to be conducted only upon completion of said inventory of a subset of storage shelves.

13. The computer program product of claim 12, wherein said computer readable program code which resumes causing said programmable computer processor to conduct said inventory additionally comprises resuming causing said programmable computer processor to conduct said inventory with the subset of storage shelves immediately following said subset having said posted completion.

14. The computer program product of claim 11, wherein said conducting of said inventory is initiated in response to detection of an inventory command, and wherein said computer readable program code which causes said programmable computer processor to detect newly received commands detects an inventory command subsequent to said initiation of said conduct of said inventory and prior to completion of said inventory for all said subsets, said subsequent inventory command is incorporated into said conduct of said inventory.

15. The computer program product of claim 14, wherein an event may occur which may corrupt said inventory, and wherein said computer program product additionally comprises computer readable program code which causes said programmable computer processor to, in response to an occurrence of said corrupting event, reset said posting of completion of all said subsets of storage shelves to incomplete.

16. The computer program product of claim 11, additionally comprising:

computer readable program code which causes said programmable computer processor to determine whether said non-inventory process involves any of said subsets of storage shelves for which a completion has been posted; and wherein said computer readable program code which causes said programmable computer processor to conduct said non-inventory process, conducts said non-inventory process only if said processor determination whether a completion has been Posted determines that no subset for which a completion has been posted is involved.

17. The computer program product of claim 16, wherein said non-inventory process comprises moving one of said media from a source to a destination, and wherein said computer readable program code which causes said programmable computer processor to conduct said non-inventory process additionally conducts said process if said processor determination whether a completion has been posted determines that said source comprises a storage shelf in any of said subsets of storage shelves for which a completion has been posted; and additionally comprises:

computer readable program code which causes said programmable computer processor to update the inventory of said subset of storage shelves for which a completion has been posted.

18. The computer program product of claim 17, wherein an event may occur during said move process which may corrupt said inventory, and wherein said computer program product additionally comprises:

computer readable program code which causes said programmable computer processor to determine whether said corrupting event occurred during said move process, setting an error status in response to said corrupting event; and computer readable program code which causes said programmable computer processor to, upon said error status indicating a corrupting event, to reset said posting of completion of said inventory of said source and said destination subsets of storage shelves to incomplete.

19. The computer program product of claim 12, additionally comprising:

computer readable program code which causes said programmable computer processor to, upon conducting said posting of said completion, count from a beginning count to a predetermined count;

computer readable program code which causes said programmable computer processor to terminate said count and again count from said beginning count upon each subsequent posting of completion for a subsequent subset;

computer readable program code which causes said programmable computer processor to terminate said count upon completion of said inventory for all said subsets of storage shelves; and computer readable program code which causes said programmable computer processor to, upon said count reaching said predetermined count, reset said posting of completion for the most recently posted subset of storage shelves to incomplete.

20. The computer program product of claim 19, wherein said computer readable program code which causes said programmable computer processor to reset said posting of completion to incomplete resets said posting of completion for all said subsets of storage shelves to incomplete.

21. A system, in a mass data storage library, for conducting an inventory of transportable data storage media stored in said library, said library having a plurality of storage shelves for storing said media, having a plurality of data storage drives, having a library controller, having at least one accessing robot controlled by said library controller, and having a sensor for conducting said inventory by identifying said media at said storage shelves, said system comprising:

a library manager, coupled to said library controller, organizing said plurality of storage shelves into a plurality of subsets of storage shelves for the purpose of conducting said inventory, and said library manager conducting an inventory of said media stored in said subsets of storage shelves, in a predetermined order by subset;

a list, coupled to said library manager, for posting that said inventory of each said subset of storage shelves is complete or incomplete, said library manager, upon completion of said inventory of each subset of storage shelves, posting that completion of said inventory to said list;

a command input, coupled to said library manager, for receiving and detecting newly received commands, and upon detecting a command for a non-inventory process, said library manager interrupts said inventory of said subsets of storage shelves, stopping said inventory of said subsets of storage shelves, said library manager conducts said non-inventory process;

and said library manager, upon completion of said non-inventory process, resumes conducting said inventory.

22. The system of claim 21, wherein said library manager accesses said detected newly received commands from said queue only upon completion of said inventory of a subset of storage shelves.

23. The system of claim 22, wherein said library manager resumes conducting said inventory with the subset of storage shelves immediately following said subset having said posted completion.

24. The system of claim 21, wherein said inventory is initiated in response to said command input receiving and detecting an inventory command, and wherein, upon said command input detecting an inventory command subsequent to said initiation of said inventory and prior to completion of said inventory, said subsequent inventory command is incorporated into said conducting of said inventory by said library manager.

25. The system of claim 24, wherein an event may occur which may corrupt said inventory, and wherein said system library manager additionally, in response to an occurrence of said corrupting event, resets said posting of completion of all said subsets of storage shelves to incomplete.

26. The system of claim 21, wherein said library manager additionally determines whether said non-inventory process involves any of said subsets of storage shelves for which a completion has been posted, and wherein said library manager conducts said non-inventory process only if said determination whether completion has been posted determines that no subset of storage shelves for which a completion has been posted is involved.

27. The system of claim 26, wherein said non-inventory process comprises said library controller operating said at least one accessing robot to move one of said media from a source to a destination, and wherein said library manager allows said library controller to additionally conduct said non-inventory process if said source comprises a storage shelf in any of said subsets of storage shelves for which a completion has been posted; and said library manager additionally responds to said library controller to update the inventory of said subset of storage shelves for which a completion has been posted.

28. The system of claim 27, wherein an event may occur during said move process which may corrupt said inventory, and wherein said library manager additionally determines whether said corrupting event occurred during said move process, sets an error status in response to said corrupting event, and upon said error status being set, resets said posting of said inventory of said source and said destination subsets of storage shelves to incomplete.

29. The system of claim 22, additionally comprising a timer coupled to said library manager, and wherein said library manager, upon posting said completion of an inventory of a subset, starting said timer to count from a beginning count to a predetermined count; upon each subsequent posting of said completion of a subsequent subset, terminating said count at said timer and again starting said timer to count from said beginning count; terminating said count at said timer upon completion of said inventory for all said subsets of storage shelves; and, upon said timer count reaching said predetermined count, resetting said posting of completion for the most recently posted subset of storage shelves to incomplete.

30. The system of claim 29, wherein said library manager resets said posting of completion for all said subsets of storage shelves to incomplete.

* * * * *